US012638727B2

(12) United States Patent　　(10) Patent No.:　US 12,638,727 B2

Zhao et al.　　(45) Date of Patent:　May 26, 2026

(54) DISPLAY PANEL

(71) Applicant: TCL China Star Optoelectronics Technology Co., Ltd., Shenzhen (CN)

(72) Inventors: Jun Zhao, Shenzhen (CN); Bin Zhao, Shenzhen (CN); Peng Du, Shenzhen (CN); Chungching Hsieh, Shenzhen (CN); Hongyuan Xu, Shenzhen (CN); Jing Liu, Shenzhen (CN); Saiping Chen, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/898,782

(22) Filed: Sep. 27, 2024

(65) Prior Publication Data

US 2026/0050191 A1　　Feb. 19, 2026

(30) Foreign Application Priority Data

Aug. 14, 2024　(CN) ........................... 202411115391.1

(51) Int. Cl.
　　*G02F 1/1343*　　(2006.01)
　　*G02F 1/1335*　　(2006.01)
(52) U.S. Cl.
　　CPC .. *G02F 1/134318* (2021.01); *G02F 1/133512* (2013.01)
(58) Field of Classification Search
　　CPC ..................... G02F 1/134318; G02F 1/133512
　　See application file for complete search history.

(56) References Cited

U.S. PATENT DOCUMENTS

| 2017/0192317 A1* | 7/2017 | Song ...................... H10D 86/60 |
| 2018/0095335 A1* | 4/2018 | Woo .................. G02F 1/136286 |
| 2024/0255813 A1* | 8/2024 | Liang ................ G02F 1/133707 |
| 2024/0313008 A1 | 9/2024 | Zhang et al. |

FOREIGN PATENT DOCUMENTS

| CN | 116469893 | 7/2023 |
| CN | 116560135 | 8/2023 |
| CN | 117518635 | 2/2024 |
| CN | 220962081 | 5/2024 |

OTHER PUBLICATIONS

Notification of Office Action and Search Report Dated Sep. 19, 2024 From The State Intellectual Property Office of the People's Republic of China Re. Application No. 202411115391.1 and Its Translation Into English. (24 Pages).

* cited by examiner

*Primary Examiner* — David Y Chung

(57)　　　　　　　ABSTRACT

A display panel is provided. In a plan view of the display panel, the black matrix layer covers the first connection portion and the second connection portion, and the second common electrode and the pixel portion are in an area of the opening, where an angle formed between an extension direction of the first connection portion and an extension direction of the first branch electrode is greater than or equal to 120 degrees and less than 180 degrees, or the extension direction of the first connection portion coincides with the extension direction of the first branch electrode.

19 Claims, 9 Drawing Sheets

DISPLAY PANEL

CROSS-REFERENCE TO RELATED APPLICATION

This application claims priority to and the benefit of Chinese Patent Application No. 202411115391.1, filed on Aug. 14, 2024, the entire content of which is hereby incorporated by reference.

TECHNICAL FIELD

The present disclosure relates to the field of display technologies, and more particularly to a display panel.

BACKGROUND

In a process of using an Transparent Storage capacity and Shielding-layer (TSS) pixel architecture in a liquid crystal display panel based on an architecture of vertical alignment technologies, an electric field can be controlled to shield data lines by adding a transparent electrode layer overlapping the data lines instead of Data line BM less (DBS), and a larger transparent storage capacitor may be formed between the transparent electrode layer and a pixel electrode, thereby greatly improving the light transmittance and the storage capacitance. However, a connection corner gj of approximately 90 degrees is formed between a pixel electrode pix located in the opening area and a via portion gk, and the connection corner gj is adjacent to the opening area, as shown in FIG. 1. The transparent electrode layer tm may pass through the connection corner gj. When the display panel is illuminated, the liquid crystal at the connection corner gj may be disordered due to the influence of a boundary electric field generated by the transparent electrode layer tm and the connection corner gj, thereby forming dark lines in the opening area, as shown in FIG. 2.

SUMMARY

Embodiments of the present disclosure provide a display panel that can reduce the risk of the dark lines in the opening area.

The embodiments of the present disclosure provide a display panel, including: an array substrate, a liquid crystal layer, and an opposite substrate disposed sequentially, where the opposite substrate includes a first substrate, a black matrix layer, and a first common electrode, the black matrix layer is disposed at a side of the first substrate close to the liquid crystal layer, the first common electrode is disposed at a side of the black matrix layer close to the liquid crystal layer, and the black matrix layer is provided with an opening; the array substrate includes a second substrate, a second common electrode, and a pixel electrode, where the second common electrode is disposed at a side of the second substrate close to the liquid crystal layer, and the pixel electrode is disposed at a different layer from the second common electrode and disposed at a side of the second common electrode close to the liquid crystal layer; the pixel electrode includes a pixel portion, a first connection portion and a second connection portion, where the second connection portion is connected to a thin film transistor, and the pixel portion includes a first trunk electrode and a first branch electrode connected to the first trunk electrode, the first connection portion is configured to connect the second connection portion and the first branch electrode; and in a plan view of the display panel, the black matrix layer covers the first connection portion and the second connection portion, and the second common electrode and the pixel portion are in an area of the opening, where an angle formed between an extension direction of the first connection portion and an extension direction of the first branch electrode is greater than or equal to 120 degrees and less than 180 degrees, or the extension direction of the first connection portion coincides with the extension direction of the first branch electrode.

Alternatively, in some embodiments of the present disclosure, the extension direction of the first connection portion coincides with the extension direction of the first branch electrode, the second connection portion includes a via sub-portion and an extension sub-portion connecting the via sub-portion, the via sub-portion is configured to connect the thin film transistor, and the extension sub-portion is configured to connect the first connection portion; and in the plan view of the display panel, the first trunk electrode extends in a first direction, and the shortest distance from an intersection line of the extension sub-portion and the first connection portion to the second common electrode in the first direction is greater than or equal to 1.3 μm.

Alternatively, in some embodiments of the present disclosure, in the plan view of the display panel, the extension sub-portion extends in a second direction perpendicular to the first direction, and the shortest distance from an intersection line of the extension sub-portion and the first connection portion to the second common electrode in the first direction is greater than or equal to 1.5 μm.

Alternatively, in some embodiments of the present disclosure, the extension direction of the first connection portion coincides with the extension direction of the first branch electrode, the second connection portion includes a via sub-portion, a first extension sub-portion, and a second extension sub-portion, the via sub-portion is configured to connect the thin film transistor, the second extension sub-portion is configured to connect the first connection portion, and the first extension sub-portion is configured to connect the via sub-portion and the second connection portion; and in the plan view of the display panel, the second extension sub-portion and the first connection portion are cross-connected, the first trunk electrode extends in a first direction, and the shortest distance from an intersection line of the second extension sub-portion and the first connection portion to the second common electrode in the first direction is greater than or equal to 1.3 μm.

Alternatively, in some embodiments of the present disclosure, in the plan view of the display panel, the first extension sub-portion extends in a second direction perpendicular to the first direction, the second extension sub-portion and the first connection portion are cross-connected, and the shortest distance from an intersection line of the second extension sub-portion and the first connection portion to the second common electrode in the first direction is greater than or equal to 1.5 μm.

Alternatively, in some embodiments of the present disclosure, there are at least two first connection portions, where one of the first connection portions is correspondingly connected to one of first branch electrodes, and a slit is formed between two adjacent ones of the first branch electrodes; and a distance between two adjacent ones of the first connection portions in a second direction perpendicular to the first direction is equal to a width of the slit.

Alternatively, in some embodiments of the present disclosure, there are at least two first connection portions, where one of the first connection portions is correspondingly connected to one of first branch electrodes, and a slit is formed between two adjacent ones of the first branch electrodes; and a distance between two adjacent ones of the first connection portions in a second direction perpendicular to the first direction is greater than twice a width of the slit.

Alternatively, in some embodiments of the present disclosure, the display panel further includes a data line extending in the first direction in the plan view of the display panel, and in a second direction perpendicular to the first direction, a distance from a junction of the first connection portion and the second connection portion to the data line is greater than 1um.

Alternatively, in some embodiments of the present disclosure, the first connection portion and the second connection portion are connected to form a corner, and in the plan view of the display panel, the corner is a rounded corner at a side of the corner close to the data line.

Alternatively, in some embodiments of the present disclosure, there are at least two first connection portions, where one of the first connection portions is correspondingly connected to one of first branch electrodes, and a slit is formed between two adjacent ones of the first branch electrodes; and the shortest distance from the first connection portion to the first trunk electrode in a second direction perpendicular to the first direction is greater than twice a width of the slit.

Alternatively, in some embodiments of the present disclosure, a width of the first connection portion is equal to a width of the first branch electrode.

Alternatively, in some embodiments of the present disclosure, the black matrix layer includes a plurality of light-shielding strips arranged at intervals in the first direction, where the light-shielding strips extend in a second direction perpendicular to the first direction, and the opening is formed between two adjacent ones of the light-shielding strips; and the second common electrode and the first common electrode are configured to be connected to the same voltage, and the second common electrode includes a first portion and a second portion, where, in the plan view of the display panel, the first portion is disposed as a whole surface in the area of the opening and overlapped with the pixel portion, the first portion further covers a portion of the data line within the opening, the second portion is connected to an opposite side of the first portion, and the second portion covers a portion of the data line within an area of the light-shielding strips.

The display panel according to the embodiments of the present disclosure includes the array substrate and the opposite substrate, where in a plan view of the display panel, the black matrix layer covers the first connection portion and the second connection portion, and the second common electrode and the pixel portion are in an area of the opening, where an angle formed between an extension direction of the first connection portion and an extension direction of the first branch electrode is greater than or equal to 120 degrees and less than 180 degrees, or the extension direction of the first connection portion coincides with the extension direction of the first branch electrode.

The angle formed between the extension direction of the first connection portion and the extension direction of the first branch electrode is set to be greater than or equal to 120 degrees and less than 180 degrees, or the extension direction of the first connection portion coincides with the extension direction of the first branch electrode. Under the influence of the boundary electric field of the second common electrode and the pixel electrode, the reverse direction of the liquid crystal in the area near the first connection portion can be improved, thereby improving the dark lines in the opening area.

DETAILED DESCRIPTION

Figure 1:
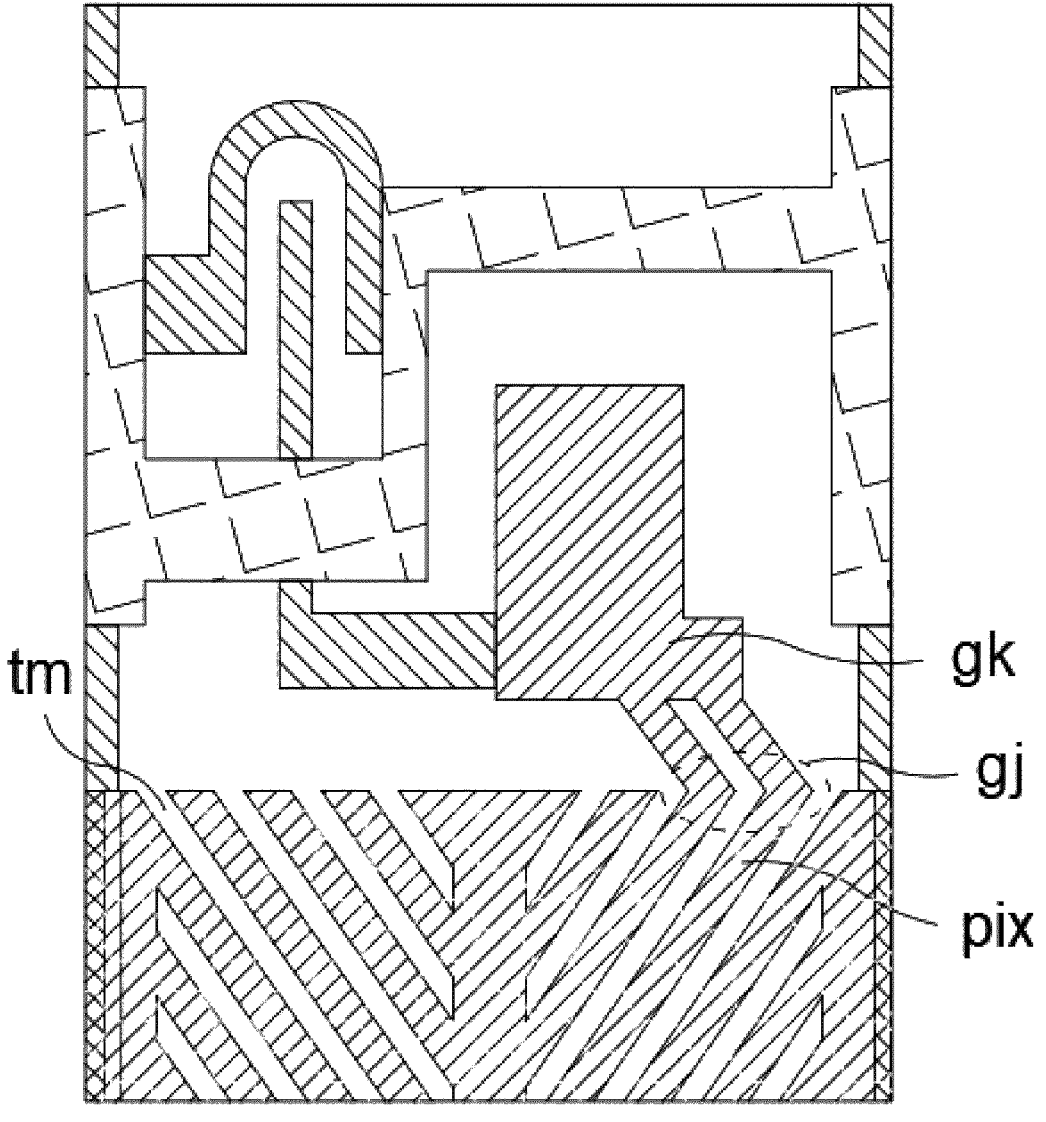
FIG. 1 is a schematic diagram of a display panel in the related art.
Figure 2:
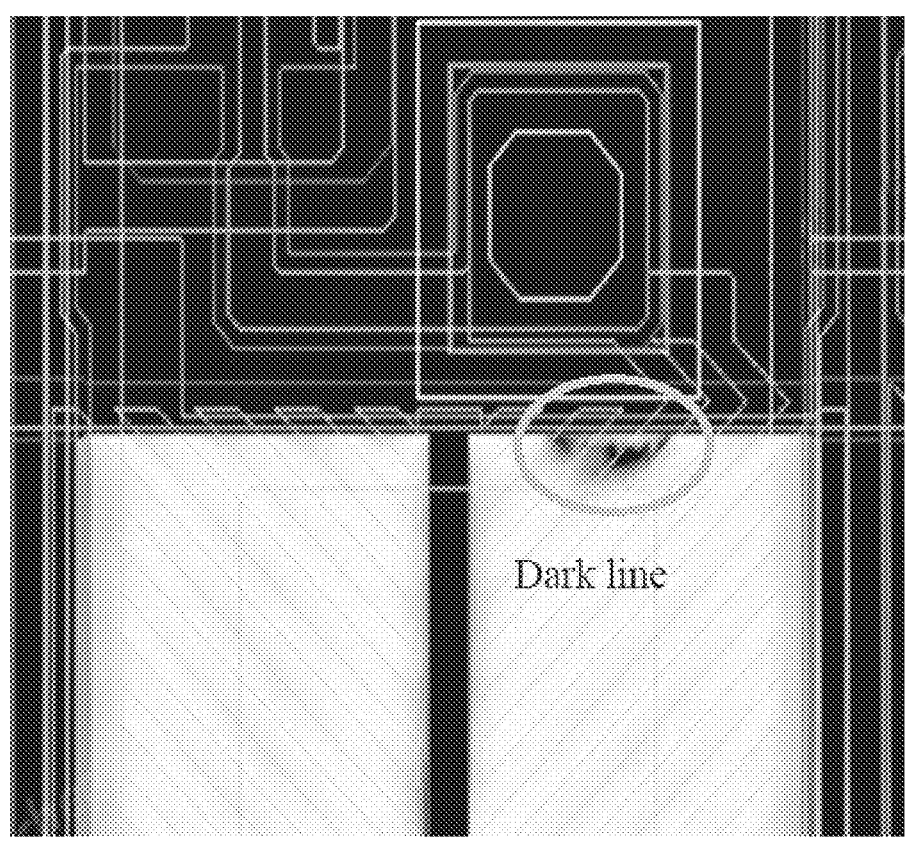
FIG. 2 is a schematic diagram of a simulated light transmission effect when a distance between a corner of a display panel in the related art and a transparent electrode layer is close to 0.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application. In addition, it should be understood that the specific implementations described here are only used to illustrate and explain the present disclosure, and are not used to limit the present disclosure. In the present disclosure, various embodiments may be combined with each other but will not be described one after another; unless otherwise stated, directional words used such as "upper" and "lower" generally refer to the upper and lower directions of the device in actual use or working state, and specifically refer to the drawing directions in the drawings; "inner" and "outer" refer to the outline of the device; and the terms "first", "second", "third" and the like are used merely as labels and do not impose numerical requirements or order of establishment.

It should be noted that the technical problem described in the background is a technical problem of presenting the dark lines in the opening area found by the inventor when the liquid crystal display panel based on the vertical alignment technologies adopts the TSS pixel architecture. Subsequently, the inventors, after disassembly and analysis of the display panel, found that the boundary electric field formed by the transparent electrode layer tm and the corner gj affects deflection of the liquid crystal of the area of the corner gj, so that the liquid crystal of the area is reversely disordered, thereby presenting of the dark lines in the opening area.

However, the display panel of the present disclosure can improve the dark lines by improving the corner gj to improve the reverse direction of the liquid crystal.

Embodiments of the present disclosure may provide a display panel, which is described in detail below. It should be noted that the description order of the following embodiments is not intended to limit the preferred order of the embodiments.

The display panel 100 of the present disclosure may adopt a Vertical Alignment (VA) technology driving architecture.

Figure 3:
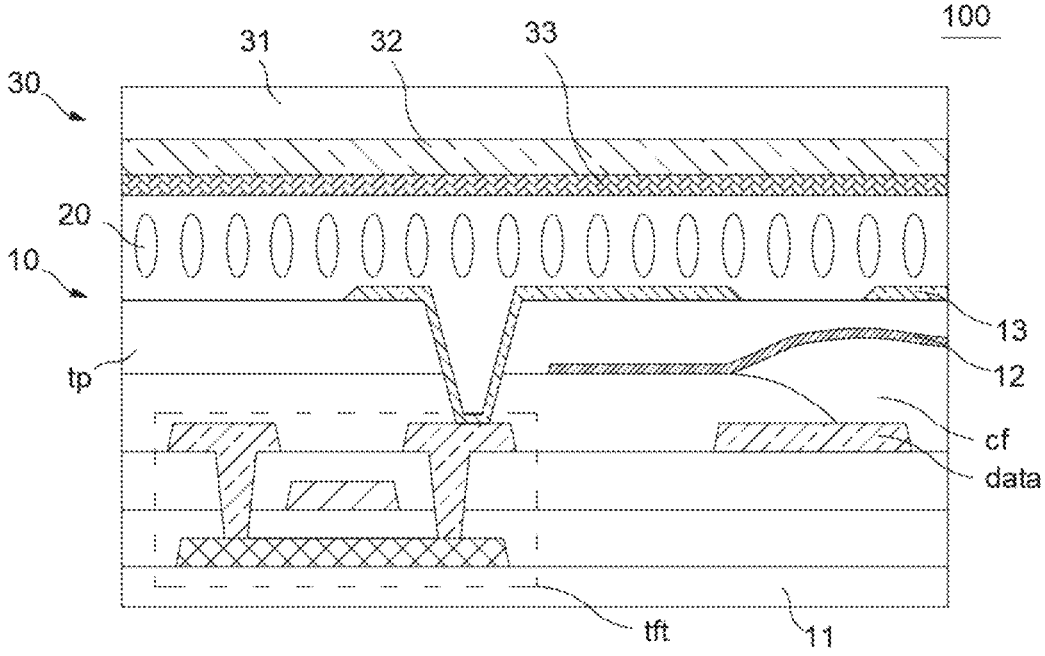
FIG. 3 is a schematic sectional view of a display panel according to some embodiments of the present disclosure.

In FIG. 3, some embodiments of the present disclosure may provide a display panel 100, including: an array substrate 10, a liquid crystal layer 20, and an opposite substrate 30 disposed sequentially.

The opposite substrate 30 may include a first substrate 31, a black matrix layer 32, and a first common electrode 33. The black matrix layer 32 may be disposed at a side of the first substrate 31 close to the liquid crystal layer 20. The first common electrode 33 may be disposed at a side of the black matrix layer 32 close to the liquid crystal layer 20.

The array substrate 10 may include a second substrate 11, a second common electrode 12, and a pixel electrode 13. The second common electrode 12 may be disposed at a side of the second substrate 11 close to the liquid crystal layer 20. The pixel electrode 13 may be disposed at a different layer from the second common electrode 12 and disposed at a side of the second common electrode 12 close to the liquid crystal layer 20.

It should be noted that the first common electrode 33 of the opposite substrate 30 and the pixel electrode 13 of the array substrate 10 may be configured to form a vertical electric field after different voltages are applied to the first common electrode 33 and the pixel electrode 13, so as to drive the liquid crystal of the liquid crystal layer 20 to be deflected, thereby realizing display of a picture.

In addition, the second common electrode 12 and the first common electrode 33 may be configured to be connected to the same common voltage, so that a boundary electric field affecting the deflection of the liquid crystal may be formed between the second common electrode 12 and the pixel electrode 13.

Next, in an area avoiding the pixel electrode 13, since the second common electrode 12 and the first common electrode 33 are connected to the same common voltage, no electric field is formed therebetween, so that the liquid crystal in the area is not deflected. Therefore, the second common electrode 12 may be configured to cover the data line data, so that the effect of shielding the data line data is achieved to save a portion of the black matrix layer 32 corresponding to the data line data.

Alternatively, the array substrate 10 may further include a scan line, the data line data, and a thin film transistor tft, where the scan line, the data line data, and the thin film transistor tft may be disposed at a side of the second substrate 11 close to the liquid crystal layer 20. The scan line may be connected to a gate of the thin film transistor tft, the data line data may be connected to an input electrode of the thin film transistor tft, and an output electrode of the thin film transistor tft may be connected to the pixel electrode 13.

Alternatively, the scan line may be disposed at the same layer as the gate of the thin film transistor tft, which is not limited thereto. The data line data may be disposed at the same layer as source and drain electrodes of the thin film transistor tft, which is not limited thereto.

The thin film transistor tft may be a top-gate type transistor, a bottom-gate type transistor, or a double-gate type transistor. FIG. 3 shows a top-gate type transistor as an example, which is not limited thereto. The structure of the thin film transistor tft is the prior art, which is not repeatedly described herein.

In some embodiments of the present disclosure, the array substrate 10 may further include a color filter layer cf and a flat layer tp, where the color filter layer cf is formed over the thin film transistor tft. The second common electrode 12 may be disposed at a side of the color filter layer cf close to the liquid crystal layer 20. The flat layer tp may cover the second common electrode 12. The pixel electrode 13 may be disposed at a side of the flat layer tp close to the liquid crystal layer 20.

Alternatively, the color filter layer cf may include a red color resistor, a green color resistor, and a blue color resistor, where one color resistor corresponds to one pixel electrode 13. The data line data is disposed between two adjacent ones of color resistors.

It should be noted in addition to the color filter layer of being formed on the array substrate 10 that the color filter layer cf may be also formed on the opposite substrate 30.

Figure 4:
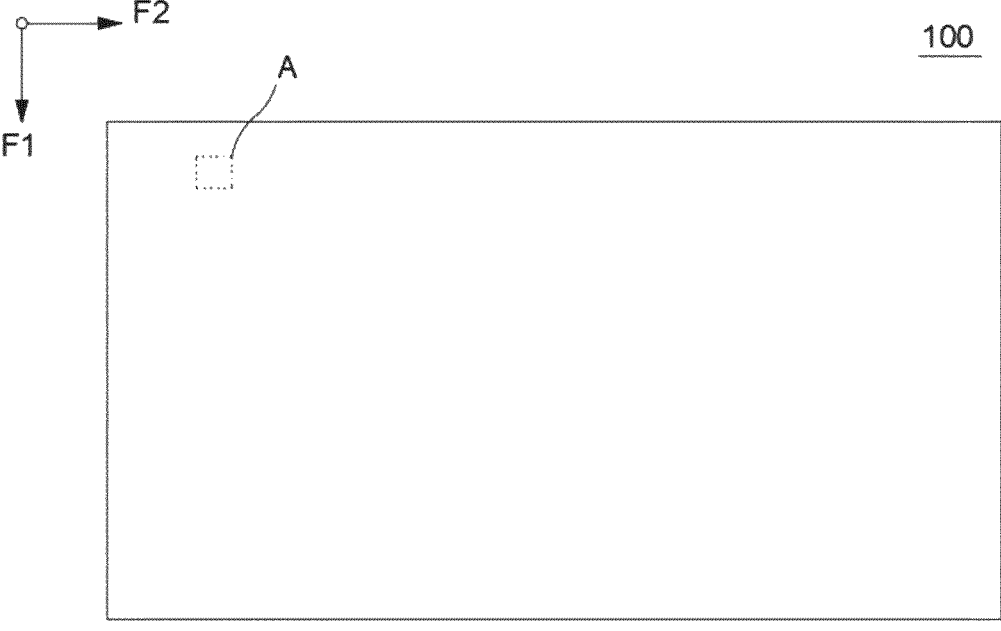
FIG. 4 is a schematic plan view of a display panel according to some embodiments of the present disclosure.

In FIG. 4, the first direction F1 may be a direction parallel to one side of the display panel 100 in a plan view, and may be, for example, a longitudinal direction of the display panel 100. The second direction F2 may be a direction parallel to another side of the display panel 100 in the plan view, and may be a lateral direction of the display panel 100.

Figure 5:
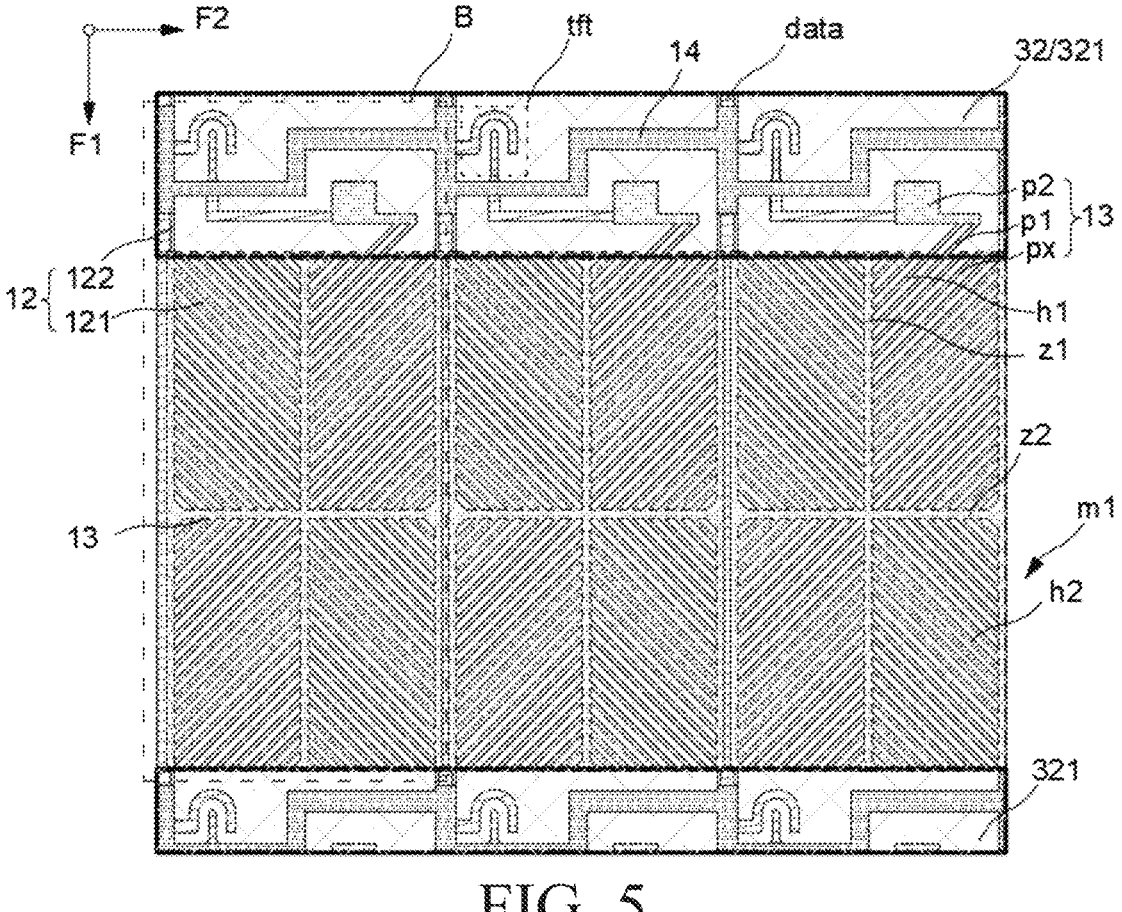
FIG. 5 is an enlarged view of a portion A in FIG. 4.
Figure 6:
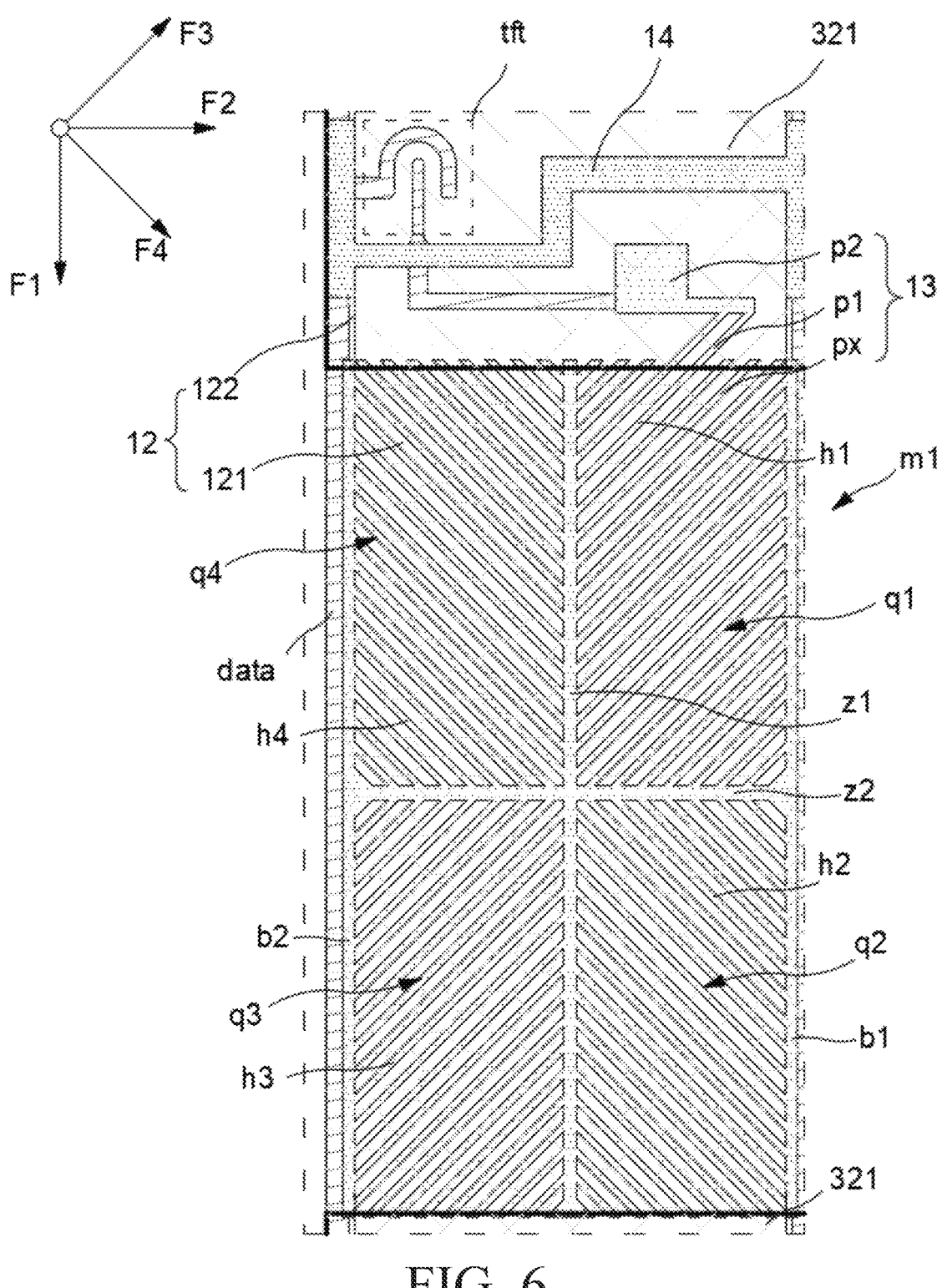
FIG. 6 is an enlarged view of a portion B in FIG. 5.
Figure 7:
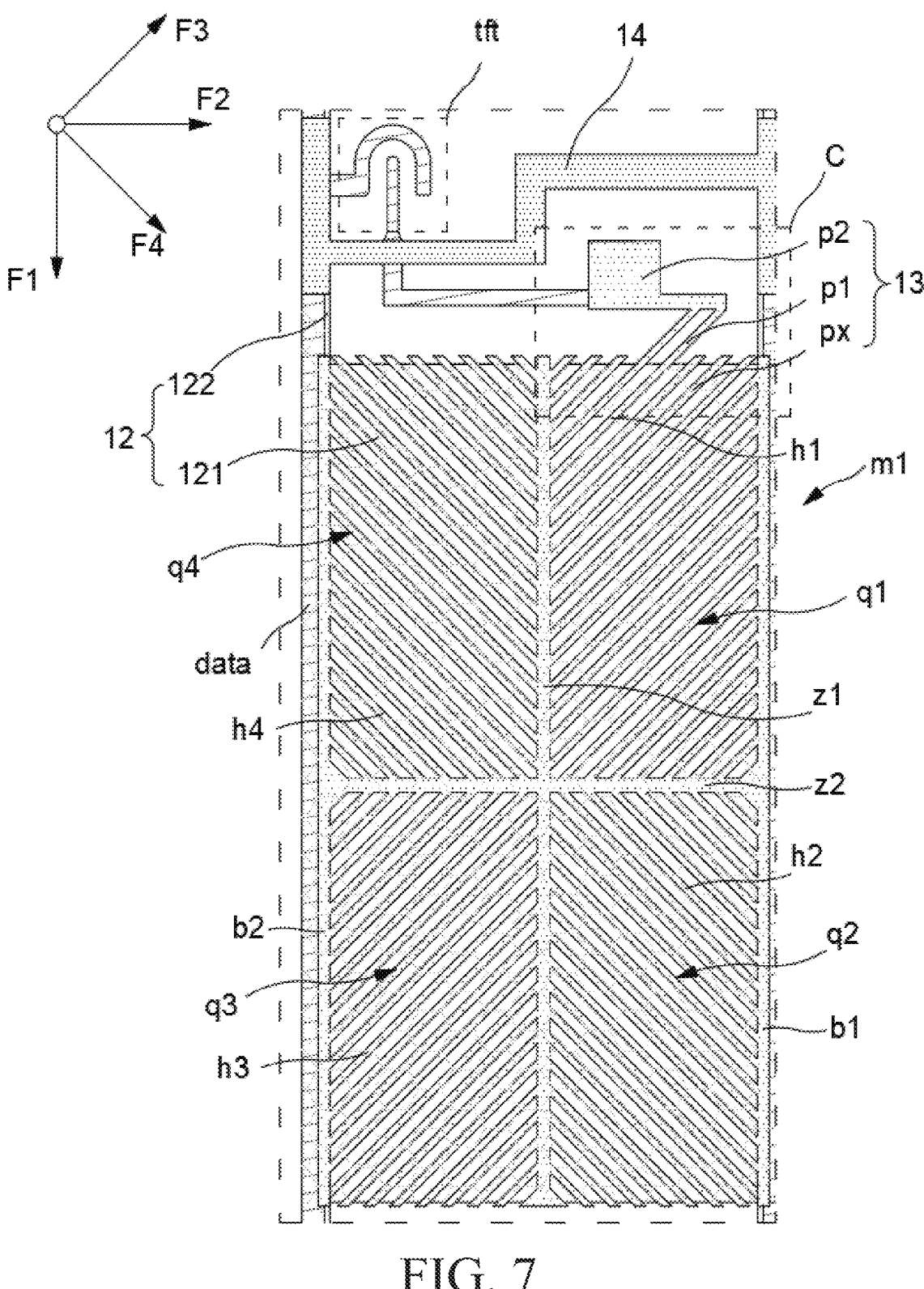
FIG. 7 is a schematic diagram of an array substrate in FIG. 6.

Alternatively, referring to FIGS. 5 to 7, in some embodiments of the present disclosure, in the opposite substrate 30, the first common electrode 33 may be provided as a whole surface or may be provided as a pattern.

The black matrix layer 32 may be provided with one or more openings m1. The black matrix layer 32 may include a plurality of light-shielding strips 321 arranged at intervals in the first direction F1, where the light-shielding strips 321 may extend in the second direction F2 perpendicular to the first direction F1, and an opening m1 may be formed between two adjacent ones of the light-shielding strips 321. That is, the openings m1 may be also arranged in the first direction F1 and extend in the second direction F2.

In some embodiments of the present disclosure, in the array substrate 10, a plurality of data lines data may extend in the first direction F1 and may be arranged in the second direction F2. A plurality of pixel electrodes 13 may be arranged in a matrix in the first direction F1 and the second direction F2. The pixel electrode 13 may have four domains, which is not limited thereto. For example, the pixel electrode 13 may have two domains or eight domains. A 4-domain architecture is illustrated below, which is not limited thereto.

In some embodiments of the present disclosure, the pixel electrode 13 may include a pixel portion px, a first connection portion p1, and a second connection portion p2. The second connection portion p2 may be configured to connect the thin film transistor tft. The pixel portion px may include a first trunk electrode z1 and a first branch electrode h1 connected to the first trunk electrode z1. The first connection portion p1 may be configured to connect the second connection portion p2 and the first branch electrode h1.

The pixel portion px may further include a second trunk electrode z2, a first side electrode b1, a second side electrode b2, a second branch electrode h2, a third branch electrode h3, and a fourth branch electrode h4. The first trunk electrode z1 and the second trunk electrode z2 may be cross-connected to form a first area q1, a second area q2, a third area q3, and a fourth area q4.

A plurality of first branch electrodes h1 may be provided at intervals in the first area q1, a portion of the first branch electrodes h1 may be connected to the first trunk electrode z1, and another portion of the first branch electrodes h1 may be connected to the second trunk electrode z2. A plurality of second branch electrodes h2 may be provided at intervals in the second area q2, a portion of the second branch electrodes h2 may be connected to the first trunk electrode z1, and another portion of the second branch electrodes h2 may be connected to the second trunk electrode z2. A plurality of third branch electrodes h3 may be provided at intervals in the third area q3, a portion of the third branch electrodes h3 may be connected to the first trunk electrode z1, and another portion of the third branch electrodes h3 may be connected to the second trunk electrode z2. A plurality of fourth branch electrodes h4 may be provided at intervals in the fourth area q4, a portion of the fourth branch electrodes h4 may be connected to the first trunk electrode z1, and another portion of the fourth branch electrodes h4 may be connected to the second trunk electrode z2. The first side electrode b1 may be connected to one side of the second trunk electrode z2, and the second side electrode b2 may be connected to another side of the second trunk electrode z2. The first branch electrode h1 and the second branch electrode h2 may be connected to the first side electrode b1, and the third branch electrode h3 and the fourth branch electrode h4 may be connected to the second side electrode b2.

Alternatively, the first trunk electrode z1 may extend in the first direction F1 and the second trunk electrode z2 may extend in the second direction F2. That is, the first trunk electrode z1 and the second trunk electrode z2 may intersect vertically, which are not limited thereto. For example, the first trunk electrode z1 and the second trunk electrode z2 may intersect non-perpendicularly.

The first side electrode b1 and the second side electrode b2 may extend in the first direction F1, which are not limited thereto. For example, the first side electrode b1 and the second side electrode b2 may extend in other directions as long as they may be cross-connected with the second trunk electrode z2.

The first branch electrode h1 and the third branch electrode h3 may extend in the third direction F3, and the second branch electrode h2 and the fourth branch electrode h4 may extend in the fourth direction F4, which are not limited thereto. For example, extension directions of the first branch electrode h1 and the third branch electrode h3 may be different from each other, and extension directions of the second branch electrode h2 and the fourth branch electrode h4 may be different from each other.

Alternatively, in some embodiments of the present disclosure, the first direction F1, the second direction F2, the third direction F3, and the fourth direction F4 may intersect two by two.

Alternatively, the third direction F3 may be perpendicular to the fourth direction F4, which is not limited thereto. For example, the third direction F3 and the fourth direction F4 may intersect non-perpendicularly. An included angle between the third direction F3 and the first direction F1 may be an acute angle. For example, the included angle between the third direction F3 and the first direction F1 may be 15 degrees, 30 degrees, 45 degrees, 60 degrees, or 75 degrees, etc. An included angle between the fourth direction F4 and the second direction F2 may be an acute angle. For example, the included angle between the fourth direction F4 and the second direction F2 may be 15 degrees, 30 degrees, 45 degrees, 60 degrees, or 75 degrees, etc.

Alternatively, the angle between the first direction F1 and each of the third direction F3 and the fourth direction F4 may be 45 degrees, respectively, and the angle between the second direction F2 and each of the third direction F3 and the fourth direction F4 may be 45 degrees, respectively.

In some embodiments of the present disclosure, second common electrodes 12 may be arranged in the first direction F1 and extend in the second direction F2. The second common electrodes 12 and the pixel portion px are overlapped to form a storage capacitor.

Alternatively, the array substrate 10 may further include a common electrode line 14 disposed at the same layer as the pixel electrode 13, where the common electrode line 14 may be configured to connect the second common electrode 12. The common electrode line 14 may be provided between two adjacent rows of pixel electrodes 13. A portion of the common electrode line 14 may be configured to cover a portion of the data line data.

Alternatively, the second common electrode 12 and the first common electrode 33 may be configured to be connected to the same common voltage, and the second common electrode 12 may include a first portion 121 and a second portion 122.

In the plan view of the display panel 100, the first portion 121 may be provided as a whole surface in the area of the opening m1 and overlapped with the pixel portion px, the first portion 121 may be configured to cover a portion of the data line data within the opening m1, the second portion 122 may be connected to an opposite side of the first portion 121, and the second portion 122 may be configured to cover a portion of the data line within the area of the light-shielding strips 321.

The first portion 121 and the pixel portion px may overlap to form a storage capacitor. The first portion 121 and the second portion 122 may cover the data line data to shield the data line data, thereby saving a portion of the black matrix layer 32 corresponding to the data line data.

In some embodiments of the present disclosure, the first portion 121 may be not provided as a whole surface. For example, a hollowed-out opening may be provided in a central area of the first portion 121 corresponding to the pixel portion px to increase the light transmittance.

Alternatively, materials of the common electrode line 14, the first common electrode 33, the second common electrode 12, and the pixel electrode 13 may each be transparent conductive materials such as indium tin oxide and indium zinc oxide.

In some embodiments of the present disclosure, referring to FIGS. 5 to 8, in the plan view of the display panel 100, the black matrix layer 32 may cover the first connection portion p1 and the second connection portion p2, and the second common electrode 12 and the pixel portion px are located in an area of the opening m1, where an included angle between the extension direction of the first connection portion p1 and the extension direction of the first branch electrode h1 may be greater than or equal to 120 degrees and less than 180 degrees, or the extension direction of the first connection portion p1 may coincide with the extension direction F3 of the first branch electrode h1.

It should be noted that, an intersection line between the first connection portion p1 and the first branch electrode h1 in the second direction F2 may be flush with an outline of a first branch electrode h1 adjacent to the first connection portion p1.

Figure 8:
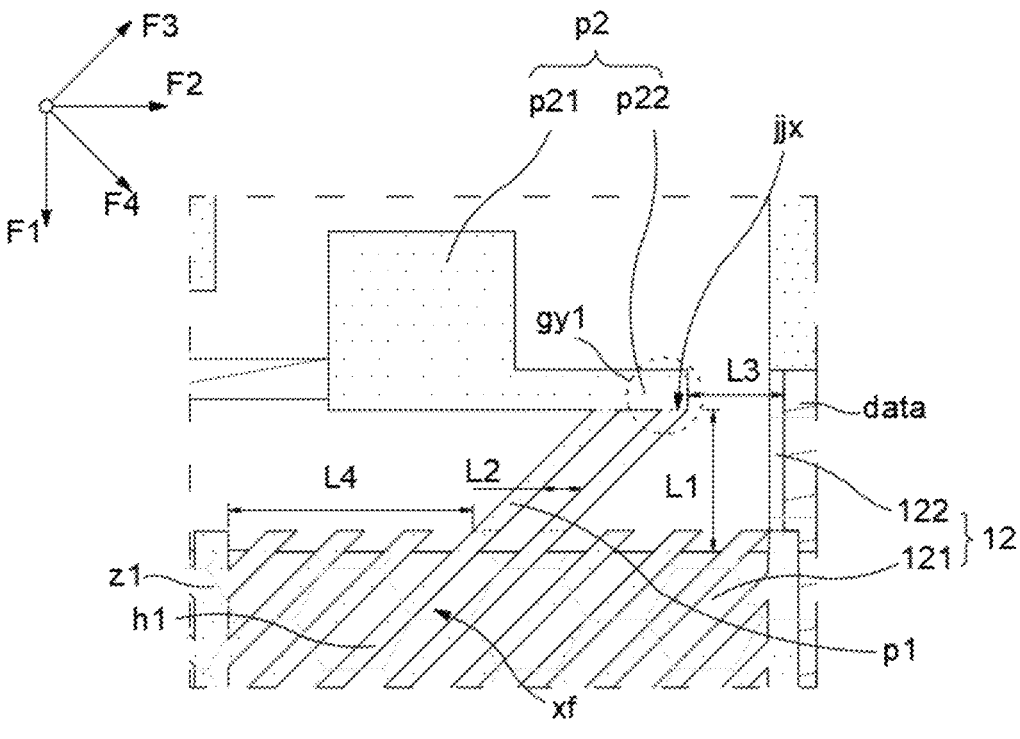
FIG. 8 is an enlarged view of a portion C in FIG. 7.
Figure 9:
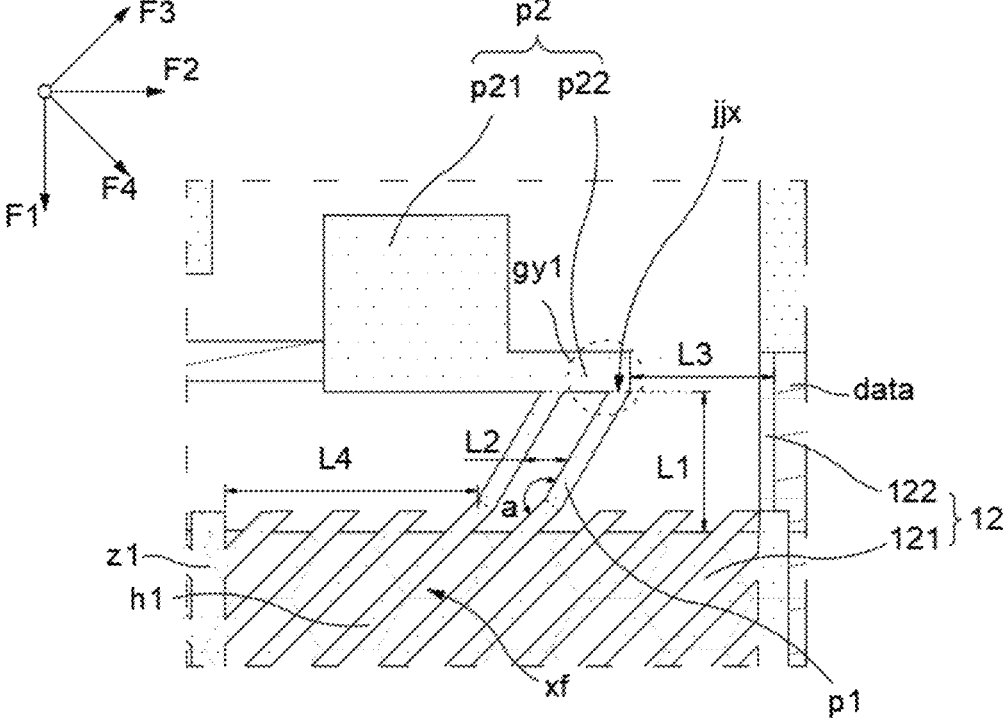
FIG. 9 is a partial schematic diagram of a display panel according to one or more embodiments of the present disclosure.

It should be understood that the extension direction of the first connection portion p1 may be set to coincide with the extension direction of the first branch electrode h3, as shown in FIG. 8, or an include angle a between the extension direction of the first connection portion p1 and the extension direction of the first branch electrode h1 may be set to be greater than or equal to 120 degrees and less than 180 degrees, as shown in FIG. 9. Under the influence of the boundary electric field of the second common electrode and the pixel electrode, the reverse direction of the liquid crystal in the area near the first connection portion can be improved, thereby improving the dark lines in the opening area.

Figure 11:
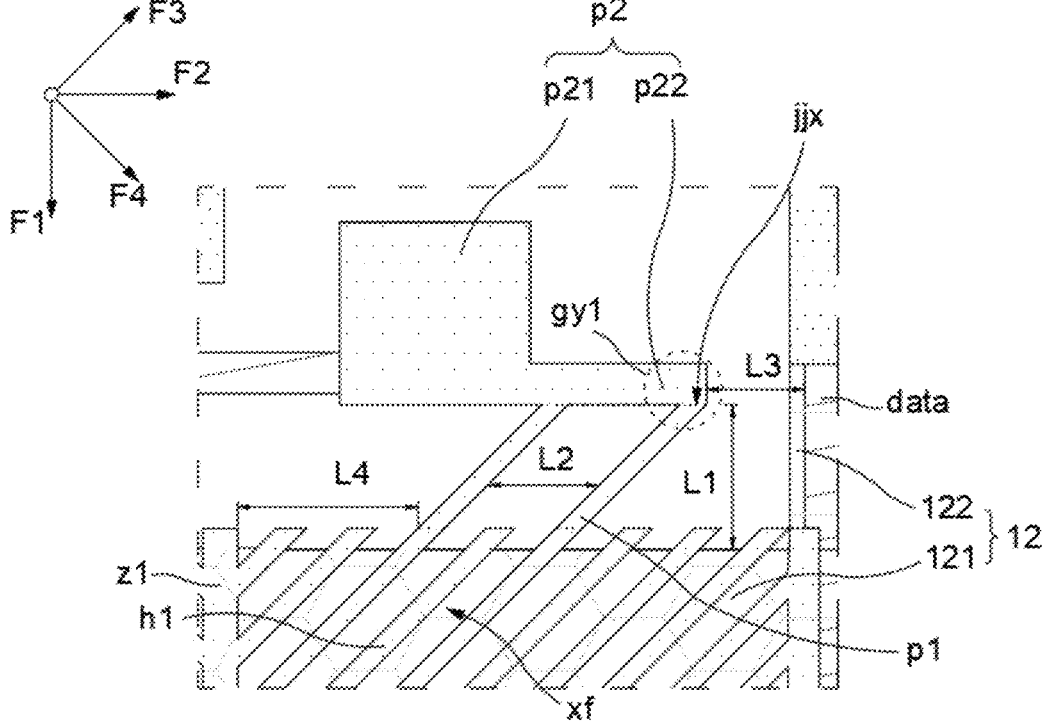
FIG. 11 is a partial schematic diagram of a display panel according to one or more embodiments of the present disclosure.

It should be noted that the position of display panel 100 in FIG. 9 may coincide with the position of the display panel 100 in FIG. 8 or FIG. 11. The embodiment corresponding to FIG. 8 may differ from the embodiment corresponding to FIG. 9 or FIG. 11 only in that structures of the first connection portion p1 and the second connection portion p2 are different, which is not repeatedly described. An example in which the extension direction of the first connection portion p1 coincides with the extension direction of the first branch electrode h1 will be illustrated below, which not limited thereto.

Alternatively, in some embodiments of the present disclosure, the extension direction of the first connection portion p1 may coincide with the extension direction of the first branch electrode h1. The second connection portion p2 may include a via sub-portion p21 and an extension sub-portion p22 connected to the via sub-portion p21, where the via sub-portion p21 may be connected to the thin film transistor tft and the extension sub-portion p22 may be connected to the first connection portion p1.

In a plan view of the display panel 100, the first trunk electrode z1 may extend in the first direction F1. The shortest distance L1 from the intersection line jjx of the extension sub-portion p22 and the first connection portion p1 to the second common electrode 12 in the first direction F1 is greater than or equal to 1.3 μm.

It should be understood that the extension sub-portion p22 and the first connection portion p1 are cross-connected to form a corner gy1, and the corner gy1 is away from the second common electrode 12 in the first direction F1, so as to reduce the influence of the boundary electric field and reduce the dark lines, while the corner gy1 is away from the area of the opening m1, and even if the dark lines still exist, the risk of presenting the dark lines in the area of the opening m1 may be reduced due to the dark lines being away from the area of the opening m1.

In one pixel area, if the larger the shortest distance L1 and the farther the corner gy1 is away from the second common electrode 12, the better the effect of improving the dark lines. Alternatively, the shortest distance L1 may be 1.3 microns, 1.4 microns, 1.5 microns, 1.6 microns, 1.7 microns, 1.8 microns, 1.9 microns, 2 microns, 3 microns, 4 microns, 5 microns, 6 microns, 7 microns, 8 microns, 9 microns or 10 microns, etc.

Alternatively, in some embodiments of the present disclosure, in the plan view of the display panel 100, the extension sub-portion p22 extends in the second direction F2 perpendicular to the first direction F1. The shortest distance L1 from the intersection line jjx of the extension sub-portion p22 and the first connection portion p1 to the second common electrode 12 in the first direction F1 may be greater than or equal to 1.5 μm.

Figure 10:
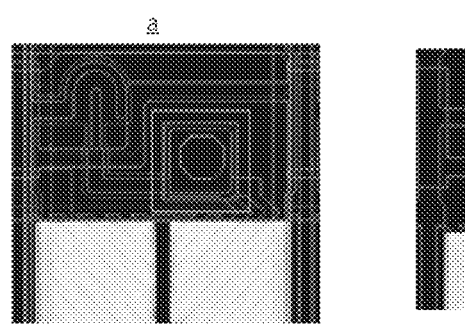
FIG. 10 is a schematic diagram of a simulated light transmission effect of increasing the shortest distance L1.
Figure 10:
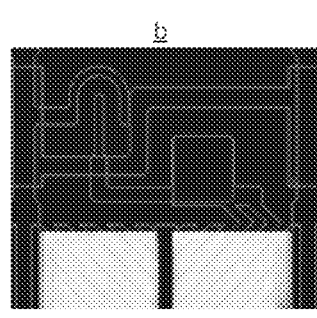
Figure 10:
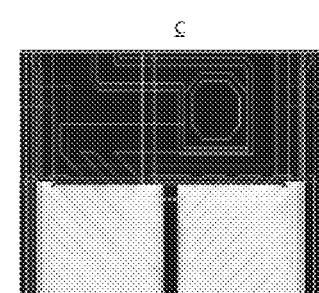

It should be understood that the extension sub-portion p22 may extend in the second direction F2, so that the intersection line jjx and the extension direction of the second common electrode 12 may be parallel to each other to achieve the effect of the shortest distance L1 being a constant value and save space arrangement. On the other hand, referring to FIG. 10, portions a and b in FIG. 10 show schematic diagrams of simulated light transmission effects of only adjusting the shortest distance L1 based on the architecture of the background. The portion a in FIG. 10 shows a schematic diagram of a simulated light transmission effect when the shortest distance L1 is equal to 2.5 μm, and the portion b in FIG. 10 shows a schematic diagram of a simulated light transmission effect when the shortest distance L1 is equal to 6 μm. The portion c in FIG. 10 shows a schematic diagram of a simulated light transmission effect when the shortest distance L1 is equal to 1.5 μm according to some embodiments of the present disclosure. As can be seen from FIG. 10 that there are no dark lines near short sides of openings of the portions a, b, and c. Therefore, the shortest distance L1 is greater than or equal to 1.5 μm, and the dark lines can be eliminated.

Alternatively, in some embodiments of the present disclosure, a width of the first connection portion p1 may be equal to a width of the first branch electrode h1, so that pretilt angles of the liquid crystal located on the first connection portion p1 and the liquid crystal located on the first branch electrode h1 tend to coincide with each other.

Alternatively, in some embodiments of the present disclosure, there may be at least two first connection portions p1. An example in which there are two first connection portions p1 is illustrated below, which is not limited thereto. For example, there may be three first connection portions p1.

One of first connection portions p1 may be correspondingly connected to one of first branch electrodes h1, and a slit xf may be formed between two adjacent ones of the first branch electrodes h1.

A distance L2 between two adjacent ones of the first connection portions p1 in the second direction F2 perpendicular to the first direction F1 may be equal to a width of the slit xf.

It should be understood that the reliability of connection between the second connection portion p2 and the pixel portion px may be improved by using a plurality of first connection portions p1 to connect the second connection portion p2 and the pixel portion px, so as to reduce the impedance of the second connection portion p2 and the pixel portion px. In addition, two first connection portions p1 may be provided adjacent to each other to reduce the need for the layout space.

Alternatively, in some embodiments of the present disclosure, in the plan view of the display panel 100, the data line data may extend in the first direction F1. A distance L3 from the junction of the first connection portion p1 and the second connection portion p2 to the data line data in the second direction F2 perpendicular to the first direction F1 may be greater than 1 μm.

It should be understood that the first connection portion p1 and the second connection portion p2 are cross-connected to form a corner gy1. In FIG. 8, the first connection portion p1 and the extension sub portion p22 are cross-connected to form the corner gy1, so that the distance L3 from the corner gy1 to the data line data is greater than 1 μm to reduce the risk of cross-talk.

Alternatively, the distance L3 from the corner gy1 to the data line data may be 1.1 microns, 1.2 microns, 1.3 microns, 1.4 microns, 1.5 microns, 1.6 microns, 1.7 microns, 1.8 microns, 1.9 microns, 2 microns, 2.1 microns, 2.2 microns, 2.3 microns, 2.4 microns or 2.5 microns, etc.

Alternatively, in some embodiments of the present disclosure, the first connection portion p1 and the second connection portion p2 may be connected to form a corner gy1, and in the plan view of the display panel 100, the corner gy1 is a rounded corner at a side of the corner gy1 close to the data line data.

It should be understood that setting the corner gy1 at the side of the data line data as a rounded corner can further reduce the risk of crosstalk.

Alternatively, in some embodiments of the present disclosure, the shortest distance L4 from the first connection portion p1 to the first trunk electrode z1 in the second direction F2 perpendicular to the first direction F1 may be greater than twice a width of the slit xf.

It should be understood that dark lines may be formed in an area where the first trunk electrode z1 is located, and the first connection portion p1 is away from the first trunk electrode z1, so that the risk of presenting the dark lines in the area where the first trunk electrode z1 is located. Therefore, the shortest distance L4 may be greater than twice the width of the slit xf, which can better reduce the risk of presenting the dark lines.

FIG. 11 shows a first connection portion p1 of the display panel 100 according to one or more embodiments of the present disclosure and a structure connected thereto, which correspond to the area shown in FIG. 8. In FIG. 11, a portion different from those of the above-described embodiments will be described to avoid redundancy elaboration.

Referring to FIG. 11, in some embodiments of the present disclosure, a distance L2 between two adjacent ones of the first connection portions p1 in the second direction F2 perpendicular to the first direction F1 may be greater than twice a width of the slit xf.

It should be understood that the larger the distance L2, the smaller the area between the two first connection portions p1 is affected by the boundary electric field, and the risk of presenting the dark lines can be further reduced.

Figure 12:
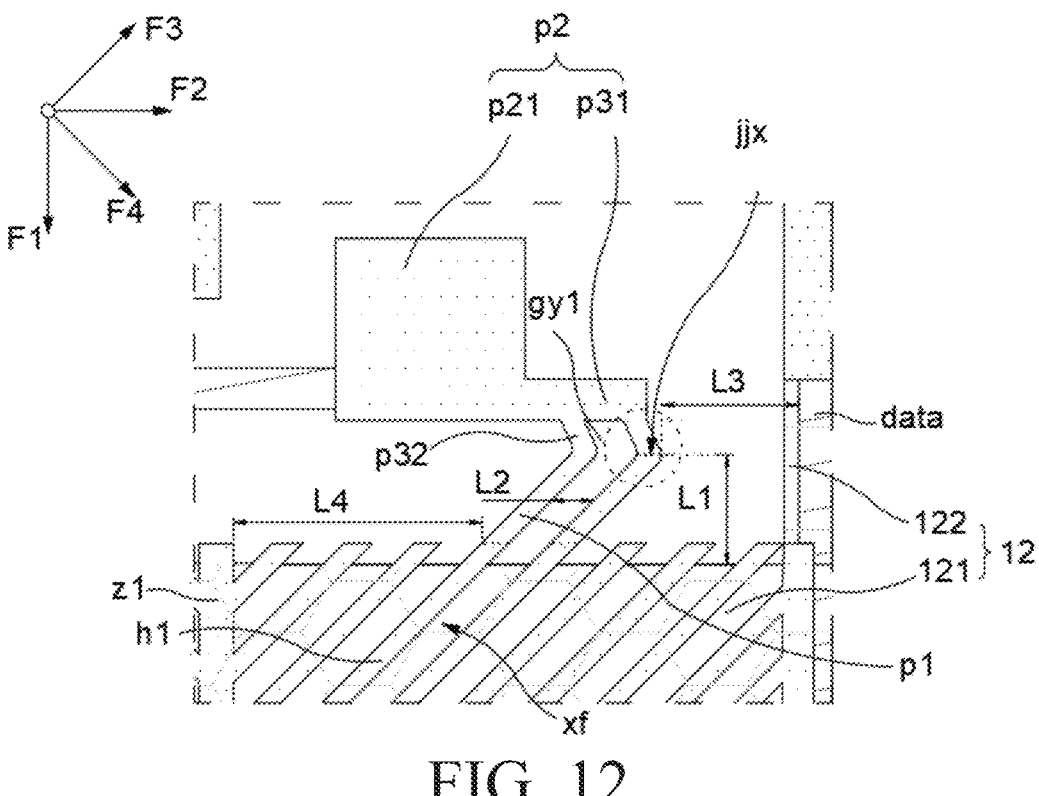
FIG. 12 is a partial schematic diagram of a display panel according to one or more embodiments of the present disclosure.

FIG. 12 shows a first connection portion p1 of the display panel 100 according to one or more embodiments of the present disclosure and a structure connected thereto, which correspond to the area shown in FIG. 8. In FIG. 12, a portion different from those of the above-described embodiments will be described to avoid redundancy elaboration.

Referring to FIG. 12, in some embodiments of the present disclosure, the extension direction of the first connection portion p1 may coincide with the extension direction of the first branch electrode h1. The second connection portion p2 may include a via sub-portion p21, a first extension sub-portion p31, and a second extension sub-portion p32. The via sub-portion p21 may be connected to the thin film transistor tft. The second extension sub-portion p32 may be connected to the first connection portion p1, and the first extension sub-portion p31 may be connected to the via sub-portion p21 and the second extension sub-portion p32.

In the plan view of the display panel 100, the second extension sub-portion p32 and the first connection portion p1 may be cross-connected, and the first trunk electrode z1 may extend in the first direction F1. The shortest distance L1 from the intersection line jjx of the second extension sub-portion p32 and the first connection portion p1 to the second common electrode 12 in the first direction F1 is greater than or equal to 1.3 μm.

It should be understood that the second extension sub-portion p32 and the first connection portion p1 are cross-connected to form a corner gy1, and the corner gy1 is away from the second common electrode 12 in the first direction F1, so as to reduce the influence of the boundary electric field and reduce the dark lines, while the corner gy1 is away from the area of the opening m1, and even if the dark lines still exist, the risk of presenting the dark lines in the area of the opening m1 may be reduced due to the dark lines being away from the area of the opening m1.

In one pixel area, if the larger the shortest distance L1 and the farther the corner gy1 is away from the second common electrode 12, the better the effect of improving the dark lines. Alternatively, the shortest distance L1 may be 1.3 microns, 1.4 microns, 1.5 microns, 1.6 microns, 1.7 microns, 1.8 microns, 1.9 microns, 2 microns, 3 microns, 4 microns, 5 microns, 6 microns, 7 microns, 8 microns, 9 microns or 10 microns, etc.

In addition, the first extension sub-portion p31 and the second extension sub-portion p32 may be cross-connected to achieve an effect of saving the space in the second direction F2.

Alternatively, in some embodiments of the present disclosure, in the plan view of the display panel 100, the first extension sub-portion p31 may extend in the second direction F2 perpendicular to the first direction F1, and the second extension sub-portion p32 and the first extension sub-portion p31 may be cross-connected. The shortest distance from the intersection line jjx of the second extension sub-portion p32 and the first connection portion p1 to the second common electrode 12 in the first direction F1 may be greater than or equal to 1.5 μm.

It should be understood that the intersection line jjx of the second extension sub-portion p32 and the first connection portion p1 is parallel to the extension direction of the second common electrode 12, so as to achieve the effect of the shortest distance L1 being a constant value, thereby saving space arrangement. The shortest distance L1 is greater than or equal to 1.5 μm, so as to improve the effect of presenting the dark lines and even eliminate the dark lines.

Alternatively, in some embodiments of the present disclosure, the angle between the extension direction of the second extension sub-portion p32 and the extension direction of the first connection portion p1 may be greater than or equal to 120 degrees and less than 180 degrees. For example, the angle between the extension direction of the second extension sub-portion p32 and the extension direction of the first connection portion p1 may be 120 degrees, 135 degrees, 150 degrees or 175 degrees, etc.

It should be understood that the greater the angle between the extension direction of the second extension sub-portion p32 and the extension direction of the first connection portion p1, the better the effect of improving the dark lines in the area of the opening m1.

Alternatively, in some embodiments of the present disclosure, the length of the second extension sub-portion p32 in the first direction F1 may be less than the length of the first connection portion p1. It should be understood the smaller the distance of the second extension sub-portion p32 in the first direction F1, the farther the corner gy1 away from the second common electrode 12, the better the effect of improving the dark lines.

Alternatively, in some embodiments of the present disclosure, the length of the second extension sub-portion p32 in the first direction F1 may be less than half the length of the first connection portion p1.

The display panel 100 according to the embodiments of the present disclosure includes the array substrate 10 and the opposite substrate 30, where in a plan view of the display panel 100, the black matrix layer 32 covers the first connection portion p1 and the second connection portion p2, and the second common electrode 12 and the pixel portion px are in an area of the opening m1, where an angle formed between an extension direction of the first connection portion p1 and an extension direction of the first branch electrode h1 is greater than or equal to 120 degrees and less than 180 degrees, or the extension direction of the first connection portion p1 coincides with the extension direction of the first branch electrode h1.

The angle formed between the extension direction of the first connection portion p1 and the extension direction of the first branch electrode h1 is set to be greater than or equal to 120 degrees and less than 180 degrees, or the extension direction of the first connection portion p1 coincides with the extension direction of the first branch electrode h1. Under the influence of the boundary electric field of the second common electrode and the pixel electrode, the reverse direction of the liquid crystal in the area near the first connection portion can be improved, thereby improving the dark lines in the opening area.

The display panels provided in the embodiments of the present disclosure are described in detail above. A specific example is used herein to describe a principle and an implementation of the present disclosure. The description of the foregoing embodiments is merely used to help understand a method and a core idea of the present disclosure. In addition, an ordinary person skilled in the art may make changes in a specific implementation manner and an application scope according to an idea of the present disclosure. In conclusion, content of this specification should not be construed as a limitation on the present disclosure.

What is claimed is:

1. A display panel, comprising: an array substrate, a liquid crystal layer, and an opposite substrate disposed sequentially; wherein the opposite substrate comprises a first substrate, a black matrix layer, and a first common electrode, wherein the black matrix layer is disposed at a side of the first substrate close to the liquid crystal layer, the first common electrode is disposed at a side of the black matrix layer close to the liquid crystal layer, and the black matrix layer is provided with an opening;

the array substrate comprises a second substrate and a pixel electrode, wherein the pixel electrode is disposed at a side of the second substrate close to the liquid crystal layer;

the pixel electrode comprises a pixel portion, a first connection portion, and a second connection portion, wherein the second connection portion is connected to a thin film transistor, the pixel portion comprises a first trunk electrode and a first branch electrode connected to the first trunk electrode, and the first connection portion is configured to connect the second connection portion and the first branch electrode; and in a plan view of the display panel, the black matrix layer covers the first connection portion and the second connection portion, and the pixel portion is located in an area of the opening, wherein an angle formed between an extension direction of the first connection portion and an extension direction of the first branch electrode is greater than or equal to 120 degrees and less than 180 degrees, or the extension direction of the first connection portion coincides with the extension direction of the first branch electrode;

wherein the array substrate further comprises a second common electrode, the second common electrode is disposed at a side of the second substrate close to the liquid crystal layer, the pixel electrode is disposed at a different layer from the second common electrode and disposed at a side of the second common electrode close to the liquid crystal layer, and the second common electrode is located in an area of the opening;

the extension direction of the first connection portion coincides with the extension direction of the first branch electrode, the second connection portion comprises a via sub-portion and an extension sub-portion connecting the via sub-portion, the via sub-portion is configured to connect the thin film transistor, and the extension sub-portion is configured to connect the first connection portion; and in the plan view of the display panel, the first trunk electrode extends in a first direction, and the shortest distance from an intersection line of the extension sub-portion and the first connection portion to the second common electrode in the first direction is greater than or equal to 1.3 μm.

2. The display panel of claim 1, wherein, in the plan view of the display panel, the extension sub-portion extends in a second direction perpendicular to the first direction, and the shortest distance from the intersection line of the extension sub-portion and the first connection portion to the second common electrode in the first direction is greater than or equal to 1.5 μm.

3. The display panel of claim 1, wherein the array substrate further comprises a second common electrode, the second common electrode is disposed at a side of the second substrate close to the liquid crystal layer, the pixel electrode is disposed at a different layer from the second common electrode and disposed at a side of the second common electrode close to the liquid crystal layer, and the second common electrode is located in an area of the opening;

the extension direction of the first connection portion coincides with the extension direction of the first branch electrode, the second connection portion comprises a via sub-portion, a first extension sub-portion, and a second extension sub-portion, the via sub-portion is configured to connect the thin film transistor, the second extension sub-portion is configured to connect the first connection portion, and the first extension sub-portion is configured to connect the via sub-portion and the second connection portion; and in the plan view of the display panel, the second extension sub-portion and the first connection portion are cross-connected, the first trunk electrode extends in a first direction, and the shortest distance from an intersection line of the second extension sub-portion and the first connection portion to the second common electrode in the first direction is greater than or equal to 1.3 μm.

4. The display panel of claim 3, wherein, in the plan view of the display panel, the first extension sub-portion extends in a second direction perpendicular to the first direction, the second extension sub-portion and the first connection portion are cross-connected, and the shortest distance from the intersection line of the second extension sub-portion and the first connection portion to the second common electrode in the first direction is greater than or equal to 1.5 μm.

5. The display panel of claim 1, wherein there are at least two first connection portions, one of the first connection portions is correspondingly connected to one of first branch electrodes, and a slit is formed between two adjacent ones of the first branch electrodes; and a distance between the two adjacent ones of the first connection portions in a second direction perpendicular to the first direction is equal to a width of the slit.

6. The display panel of claim 2, wherein there are at least two first connection portions, one of the first connection portions is correspondingly connected to one of first branch electrodes, and a slit is formed between two adjacent ones of the first branch electrodes; and a distance between the two adjacent ones of the first connection portions in a second direction perpendicular to the first direction is equal to a width of the slit.

7. The display panel of claim 3, wherein there are at least two first connection portions, one of the first connection portions is correspondingly connected to one of first branch electrodes, and a slit is formed between two adjacent ones of the first branch electrodes; and a distance between the two adjacent ones of the first connection portions in a second direction perpendicular to the first direction is equal to a width of the slit.

8. The display panel of claim 4, wherein there are at least two first connection portions, one of the first connection portions is correspondingly connected to one of first branch electrodes, and a slit is formed between two adjacent ones of the first branch electrodes; and a distance between the two adjacent ones of the first connection portions in a second direction perpendicular to the first direction is equal to a width of the slit.

9. The display panel of claim 1, wherein there are at least two first connection portions, one of the first connection portions is correspondingly connected to one of first branch electrodes, and a slit is formed between two adjacent ones of the first branch electrodes; and a distance between two adjacent ones of the first connection portions in a second direction perpendicular to the first direction is greater than twice a width of the slit.

10. The display panel of claim 1, further comprising: a data line extending in the first direction in the plan view of the display panel, and a distance from a junction of the first connection portion and the second connection portion to the data line in a second direction perpendicular to the first direction is greater than 1 μm.

11. The display panel of claim 10, wherein the first connection portion and the second connection portion are connected to form a corner, and in the plan view of the display panel, the corner is a rounded corner at a side of the corner close to the data line.

12. The display panel of claim 1, wherein there are at least two first connection portions, one of the first connection portions is correspondingly connected to one of first branch electrodes, and a slit is formed between two adjacent ones of the first branch electrodes; and the shortest distance from the first connection portion to the first trunk electrode in a second direction perpendicular to the first direction is greater than twice a width of the slit.

13. The display panel of claim 2, wherein there are at least two first connection portions, one of the first connection portions is correspondingly connected to one of first branch electrodes, and a slit is formed between two adjacent ones of the first branch electrodes; and the shortest distance from the first connection portion to the first trunk electrode in a second direction perpendicular to the first direction is greater than twice a width of the slit.

14. The display panel of claim 3, wherein there are at least two first connection portions, one of the first connection portions is correspondingly connected to one of first branch electrodes, and a slit is formed between two adjacent ones of the first branch electrodes; and the shortest distance from the first connection portion to the first trunk electrode in a second direction perpendicular to the first direction is greater than twice a width of the slit.

15. The display panel of claim 4, wherein there are at least two first connection portions, one of the first connection portions is correspondingly connected to one of first branch electrodes, and a slit is formed between two adjacent ones of the first branch electrodes; and the shortest distance from the first connection portion to the first trunk electrode in a second direction perpendicular to the first direction is greater than twice a width of the slit.

16. The display panel of claim 1, wherein the black matrix layer comprises a plurality of light-shielding strips arranged at intervals in the first direction, the light-shielding strips extend in a second direction perpendicular to the first direction, and the opening is formed between two adjacent ones of the light-shielding strips; and the second common electrode and the first common electrode are configured to be connected to the same voltage, and the second common electrode comprises a first portion and a second portion, wherein, in the plan view of the display panel, the first portion is disposed as a whole surface in the area of the opening and overlapped with the pixel portion, the first portion further covers a portion of the data line within the opening, the second portion is connected to an opposite side of the first portion, and the second portion covers a portion of the data line within an area of the light-shielding strips.

17. The display panel of claim 2, wherein the black matrix layer comprises a plurality of light-shielding strips arranged at intervals in the first direction, the light-shielding strips extend in a second direction perpendicular to the first direction, and the opening is formed between two adjacent ones of the light-shielding strips; and the second common electrode and the first common electrode are configured to be connected to the same voltage, and the second common electrode comprises a first portion and a second portion, wherein, in the plan view of the display panel, the first portion is disposed as a whole surface in the area of the opening and overlapped with the pixel portion, the first portion further covers a portion of the data line within the opening, the second portion is connected to an opposite side of the first portion, and the second portion covers a portion of the data line within an area of the light-shielding strips.

18. The display panel of claim 3, wherein the black matrix layer comprises a plurality of light-shielding strips arranged at intervals in the first direction, the light-shielding strips extend in a second direction perpendicular to the first direction, and the opening is formed between two adjacent ones of the light-shielding strips; and the second common electrode and the first common electrode are configured to be connected to the same voltage, and the second common electrode comprises a first portion and a second portion, wherein, in the plan view of the display panel, the first portion is disposed as a whole surface in the area of the opening and overlapped with the pixel portion, the first portion further covers a portion of the data line within the opening, the second portion is connected to an opposite side of the first portion, and the second portion covers a portion of the data line within an area of the light-shielding strips.

19. The display panel of claim 4, wherein the black matrix layer comprises a plurality of light-shielding strips arranged at intervals in the first direction, the light-shielding strips extend in a second direction perpendicular to the first direction, and the opening is formed between two adjacent ones of the light-shielding strips; and the second common electrode and the first common electrode are configured to be connected to the same voltage, and the second common electrode comprises a first portion and a second portion, wherein, in the plan view of the display panel, the first portion is disposed as a whole surface in the area of the opening and overlapped with the pixel portion, the first portion further covers a portion of the data line within the opening, the second portion is connected to an opposite side of the first portion, and the second portion covers a portion of the data line within an area of the light-shielding strips.

* * * * *